J. L. MAPES.
DIFFERENTIAL DRIVING MECHANISM FOR MOTOR VEHICLES.
APPLICATION FILED MAY 15, 1920.

1,360,428.

Patented Nov. 30, 1920.

Inventor
James L. Mapes,
By Watson E. Coleman
Attorney

J. L. MAPES.
DIFFERENTIAL DRIVING MECHANISM FOR MOTOR VEHICLES.
APPLICATION FILED MAY 15, 1920.
1,360,428.
Patented Nov. 30, 1920.
2 SHEETS—SHEET 2.
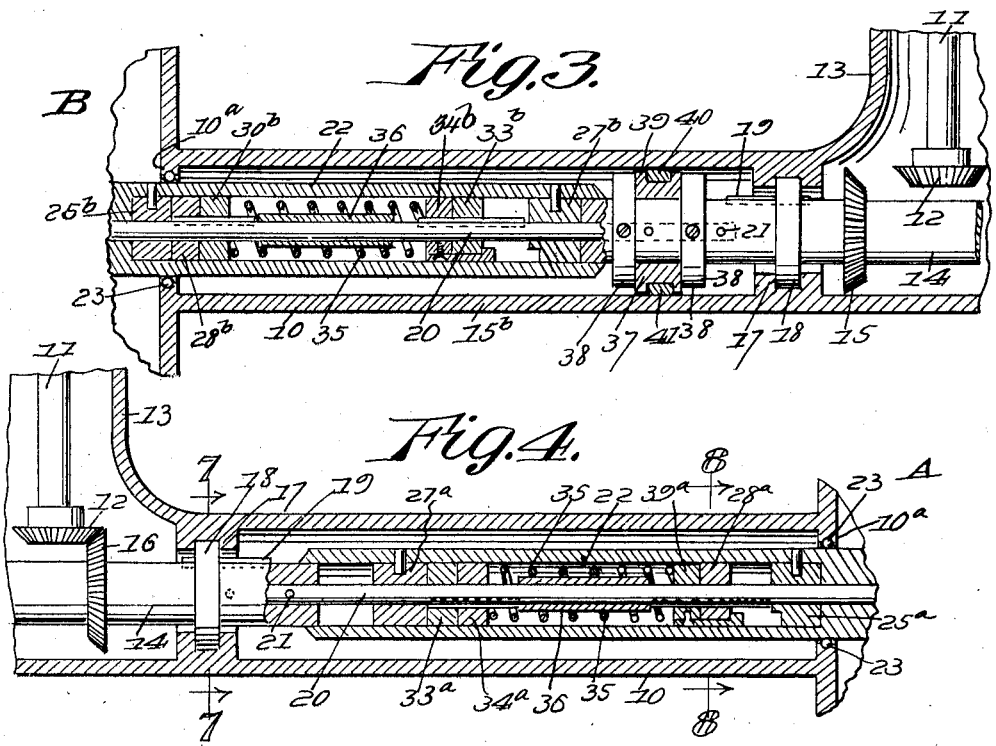
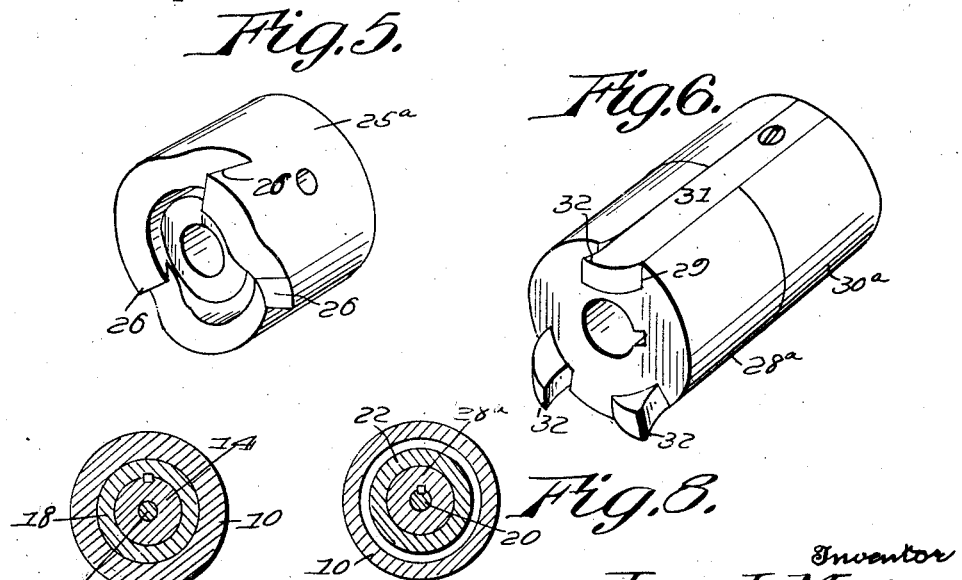
Inventor
James L. Mapes,
By Watson E. Coleman
Attorney

UNITED STATES PATENT OFFICE.

JAMES L. MAPES, OF JERSEY SHORE, PENNSYLVANIA.

DIFFERENTIAL DRIVING MECHANISM FOR MOTOR-VEHICLES.

1,360,428. Specification of Letters Patent. Patented Nov. 30, 1920.

Application filed May 15, 1920. Serial No. 381,621.

*To all whom it may concern:*

Be it known that I, JAMES L. MAPES, a citizen of the United States, residing at Jersey Shore, in the county of Lycoming and State of Pennsylvania, have invented certain new and useful Improvements in Differential Driving Mechanism for Motor-Vehicles, of which the following is a specification, reference being had to the accompanying drawings.

This invention relates to the driving mechanism of motor vehicles, tractors, and the like, and particularly to that part of the driving mechanism which is contained within the rear axle and which transmits power to the wheels.

The general object of my invention is to provide a mechanism of this kind whereby power may be transmitted differentially so that the two power driven wheels of the vehicle may rotate at different speeds under certain circumstances, my mechanism being designed to take the place of the ordinary differential.

A further object of the invention is to provide a mechanism of this character wherein, when the vehicle is turning on a curve, the inner wheel will be positively driven while the outer wheel will overrun the driving shaft, and in this connection to provide a mechanism wherein, if the inner wheel should slip, as for instance from running with mud, the power will be then immediately transmitted to the outer wheel of the vehicle so that the machine will not stall.

A further object of the invention is to provide a construction of this character such that if by any chance one of the driven gear wheels is broken, it is possible, by throwing the transmission mechanism to "reverse" and by a proper adjustment of the mechanism, to engage the unbroken gear wheel with the driving gear wheel and thus secure the transmission of driving force to the machine.

A further object is to provide a construction of this character wherein, if one axle breaks, that is one axle or driving shaft section breaks and thus fails to transmit power to the corresponding wheel, the other driving shaft or axle will transmit power.

And another object is to provide a mechanism of this character whereby a reverse movement may be communicated to the wheels and whereby this reverse movement may be transmitted to one of the wheels of the vehicle if the axle or driving shaft of the other wheel for any reason breaks.

A further object is to provide a mechanism of this character which is very simple, can be easily applied to motor vehicles of ordinary makes, which is thoroughly efficient, and in which the driving action is positive.

Other objects will appear in the course of the following description.

My invention is illustrated in the accompanying drawings, wherein:—

Fig. 3 is an enlarged longitudinal sectional view of the left hand end of the axle shown in Fig. 1;

Fig. 4 is an enlarged longitudinal sectional view of the right hand end of the mechanism shown in Fig. 1;

Fig. 5 is a perspective view of one of the clutch members;

Fig. 6 is a perspective view of the coacting clutch member;

Fig. 7 is a section on the line 7—7 of Fig. 4;

Fig. 8 is a section on the line 8—8 of Fig. 4.

Figure 1:
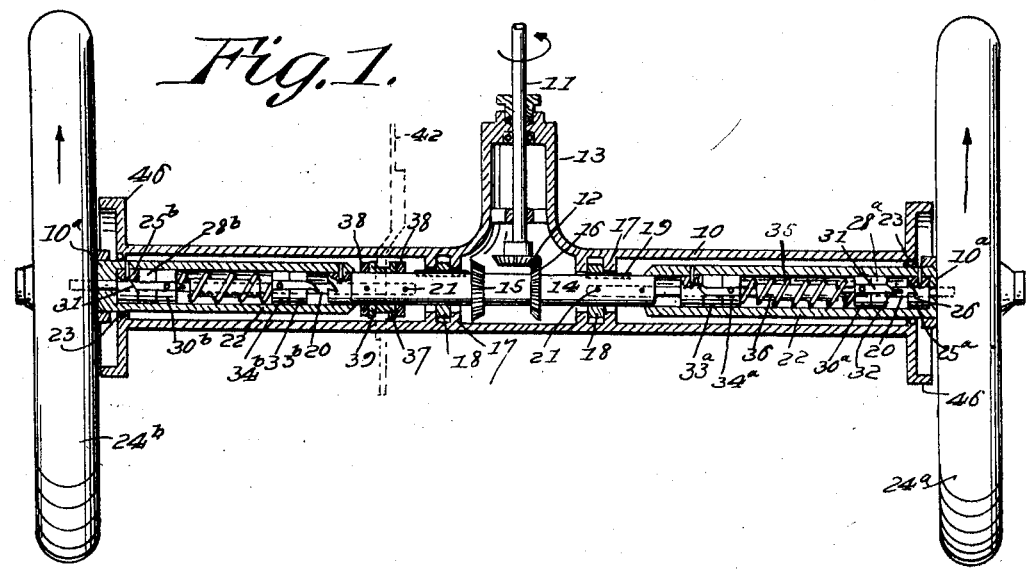
Figure 1 is a longitudinal sectional view of the driving axle and housing of a motor vehicle.

Referring to these drawings, 10 designates the lower half of the fixed axle or axle housing of a motor vehicle, and 11 the driving shaft or power shaft driven by the crank shaft of the engine in the usual manner extending longitudinally of the automobile and carrying at its rear end a beveled pinion 12. The shaft housing is designated 13. Disposed within the housing or fixed axle 10 is a longitudinally slidable and rotatable shaft section 14 carrying upon it the two beveled gear wheels 15 and 16 which are adapted to engage with the beveled gear wheel 12. This shifting shaft section 14 may be supported in suitable bearings in the housing in any suitable manner but the bearings should be such that the shaft section 14 may be shifted longitudinally to bring either of the gears 15 or 16 into engagement with the gear 12, while at the same time the shaft section is rotatable. I have illustrated for this purpose the housing 10 on each side of the housing 13 as being formed with a pair of annular ribs 17, and disposed between these ribs is a floating ring or bearing 18. The shaft section 14 is splined, as at 19, to these rings 18. Thus the shaft section and the rings 18 rotate together but the shaft section is longitudinally movable with relation to the rings. I do not wish to be limited to this particular manner of mounting the shaft section 14, and it is obvious that ball bearings or any other suitable anti-friction bearings may be used within the raceways formed by the ribs 17.

I have illustrated the shaft section 14 as having attached to its ends the longitudinally extending clutch bearing rods 20. I have illustrated the ends of the shaft section 14 as being recessed or bored and these rods 20 as being inserted in these recesses and pinned to the shaft section 14 by means of pins 21, but I do not wish to be limited to this. These rods 20 extend out through the closed end $10^a$ of the housing 10 and are, of course, slidable in the closed ends of the housing. Surrounding the rods 20 and extending inward through the end $10^a$ of the housing and having sliding engagement with the ends of the shaft section 14 are the shaft sections 22. These are annular in cross section and may be supported by ball bearings or anti-friction bearings 23 in the housing in any suitable manner. I have shown the wheels 24 and $24^a$ as being mounted upon and rotating with the shaft sections 22.

Pinned or otherwise attached to the outer ends of the tubular shaft sections 22 are the clutch members $25^a$ and $25^b$, one of which is illustrated in Fig. 5. These clutch members are annular in form to permit the passage of the rods 20 and the inner end faces of these clutch members are formed with a series of ratchet teeth 26. These ratchet teeth on the clutch member $25^a$ extend reversely to the ratchet teeth on the clutch memebr $25^b$. Disposed at the inner ends of the tubular shafts 22 are the clutch members $27^a$ and $27^b$ which are pinned to the tubular shafts, these clutch members $27^a$ and $27^b$ being of the same form as the clutch members $25^a$ and $25^b$ and having ratchet teeth confronting the ratchet teeth 26 of the members $25^a$ and $25^b$. These also are reversely placed, that is the teeth on the clutch member $27^a$ extend in reverse direction to the teeth on the clutch member $27^b$.

Mounted upon the rods 20 to confront the clutch members $25^a$ and $25^b$ are the annuli $28^a$ and $28^b$ whose peripheries are longitudinally grooved, as at 29, at a plurality of points and mounted upon each rod 20 behind the corresponding annulus are the clutch members $30^a$ and $30^b$, having clutch teeth 31 disposed in grooves in the clutch member $30^a$ or $30^b$ and projecting through the grooves 29 so that the beveled extremities 32 of the teeth 31 project beyond the face of the corresponding member $28^a$ or $28^b$. These extremities 32 of the teeth 31 are adapted to engage with the teeth on the members $25^a$ and $25^b$ respectively and, of course, the teeth on the clutch member $30^a$, which confronts the clutch member $25^a$, are reversed to the teeth on the member $30^b$, which confronts the member $25^b$. Confronting the clutch members $27^a$ and $27^b$ and mounted upon the rods 20 are the annuli $33^a$ and $33^b$ which are longitudinally grooved along their peripheries for the reception of the clutch teeth carried upon the clutch members $34^a$ and $34^b$. The members $30^a$ and $30^b$ and the members $34^a$ and $34^b$ are urged away from each other so as to project the clutch teeth beyond the annuli $28^a$ and $28^b$ and $33^a$ and $33^b$ by means of coiled springs 35 which surround the rods 20 and which also surround a spacing sleeve 36 mounted on these rods, which spacing sleeve simply acts to prevent the two clutch members held apart by the spring from shifting unduly toward each other if the spring should break.

Figure 2:
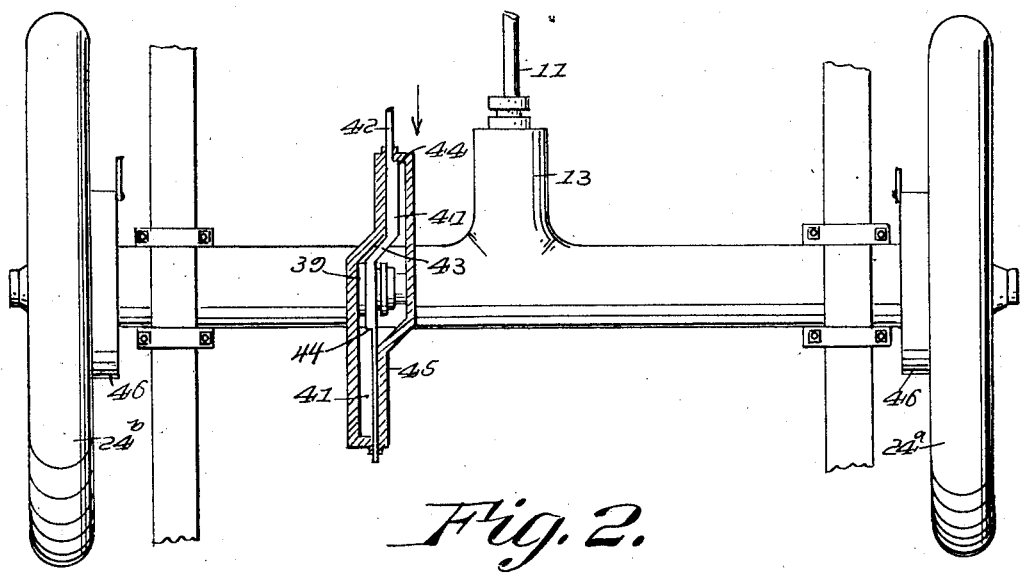
Fig. 2 is an elevation of the same, the housing for the shaft shifting mechanism being shown in section.

For the purpose of shifting the shaft section 14 so as to carry one or the other of its gears 15 or 16 into engagement with the driving gear 12, I mount upon this shaft section 14 at any desired point in its length a shifting member 37 in the form of a block through which the shaft section 14 passes and in which it rotates. This block is held from independent lateral movement with relation to the shaft section 14 by collars 38. This block is formed on its upper and lower faces with the lateral flanges 39, and disposed between these inner and outer pairs of flanges 39 are actuating rods 40 and 41, these actuating rods being connected to a common shank 42 which extends in a convenient position to the driver. These rods 41 are angularly bent or deflected at one point, as at 43, but on either side of this angular portion 43 they extend parallel to the line of draft. Therefore, it will be obvious from Fig. 2 that if the rod 42 be shifted in the direction of the arrow in Fig. 2, the inclined portion 43 engaging between the flanges 39 will wedge the shifting member 37 toward the right in Figs. 1 and 2, thus shifting the member 14 to the right, and that assuming that the members 41 have been shifted so as to carry the inclined portions thereof rearward beyond the member 37, that then a motion reverse to the arrow in Fig. 2 will cause this shifting member 37 to be shifted toward the left in Figs. 1 and 2, shifting the shaft section 14 toward the left and carrying the gear 16 into engagement with the gear wheel 12. The straight portions on either side of the deflected portions 43, when they engage with the flanges 39 of the member 37, will act to hold the member 37 from any shifting movement.

It will be noted also that the straight portions of the rods 41 on each side of the inclined portions 43 are formed to provide stops 44 abutting against the ends of the casing 45 in which this rod operates. This casing or housing 45 is designed to receive oil so that the shifting rods 41 will travel in oil. I do not wish to be limited to this particular manner of shifting the shaft section 14, as other means may be provided for this purpose, but the means which I have shown is positive in its action and permits the shaft section 14 to be shifted with relatively little power and also causes the shaft section 14 to be positively held in its shifted positions.

As illustrated, the housing 10 carries at its ends the brake drums 46, as is usual in motor vehicles, over which the brakes for the rear wheels will operate.

Preferably, the ends 32 of the teeth 31 are slightly undercut or overhang slightly and the corresponding recesses in the coacting clutch members, and into which the extremities 32 of the teeth 31 fit, are also undercut so as to secure a good driving engagement between the teeth 31 and the clutch teeth on the coacting clutch members and tend to prevent any disengagement between the teeth when the clutch members provided with the teeth 31 are rotating with the coacting clutch members.

The operation of this invention is as follows: Assuming that the shaft 11 is rotating in the direction of the arrow in Fig. 1, then it will be obvious that the wheels 24 and 24$^a$ will rotate in the direction of the arrow. With the parts in the position shown in Fig. 1, the clutch member 30$^a$ which carries the teeth 31 is out of engagement with the clutch member 25$^a$, but the clutch member 27$^a$ is in engagement with the clutch member 33$^a$. Therefore, power is transmitted from the middle shaft section 14 to the shaft section 22 on the right hand side of the machine. On the left hand side of the machine power is transmitted from the shaft section 14 by way of the clutch member 30$^b$ to the clutch member 25$^b$, while the clutch member 34$^b$ is out of engagement with the clutch member 27$^b$. Power is thus transmitted to both of the wheels to cause them to rotate in a direction to carry the machine forward. If now the machine is turning on a curve with the wheel 24$^a$ at the smallest portion of the curve and the wheel 24$^b$ at the largest portion of the curve, power will be transmitted from the section 14 of the shaft to the clutch member 34$^a$ and its teeth and thus to the clutch member 27$^a$ and thus to the tubular shaft 22 and to the wheel 24$^a$. At the left hand end of the shaft, however, the wheel 24$^b$ will, of course, rotate faster than the wheel 24$^a$, and as a consequence the clutch member 25$^b$ will force the clutch teeth 31 of the clutch member 30$^b$ inward against the action of the spring 35 and thus the shaft section 22 at the left hand end of the machine will move faster than the middle section 14 of the shaft. If, however, the wheel 24$^a$ should strike mud or should otherwise tend to slip so that it could not get sufficient bearing against the road to propel the machine, the wheel 24$^b$ would slow down for an instant until the clutch teeth of clutch 30$^b$ again engage the clutch teeth of the clutch 25$^b$ and power would be transmitted to the wheel 24$^a$ and the machine would proceed under power of wheel 24$^b$ until the wheel 24$^a$ again secured traction or until the vehicle straightened out, whereupon power would be, of course, delivered to both of the wheels 24$^a$ and 24$^b$. The same operation would, of course, take place if the machine were turning and the wheel 24$^b$ described the smallest circle and the wheel 24$^a$ rotated at the higher speed. In this case, the clutches of the wheel 24$^a$ would slip and wheel 24$^b$ would transmit the power to drive the machine forward. If either of the shaft sections 22 should break, power would still be transmitted to that shaft section which was unbroken and to the wheel corresponding thereto, and if this should occur on a curve, the mechanism would act precisely as it does where one wheel strikes mud and fails to secure any tractive engagement with the road. The car can then proceed under the power delivered to one wheel. This is impossible with differentials as ordinarily constructed.

By shifting the member 14 so as to carry the gear wheel 15 into engagement with the driving gear wheel 12, it is obvious that the rotation of the driving wheels 24$^a$ and 24$^b$ will be reversed so that the machine will be driven backward. In this case, and referring to Figs. 1, 3 and 4, the clutch member 30$^a$ will operatively engage with the clutch member 25$^a$, the clutch member 34 will be disengaged from the clutch member 27$^a$, the clutch member 34$^b$ will be operatively engaged with the clutch member 27$^b$, and the clutch member 30$^b$ will be withdrawn from its clutching engagement with the clutch member 25$^b$, but the clutching action will be the same as heretofore described. In other words, the tubular axle 22 or shaft section on the right hand side of the machine will be engaged with the middle shaft section 14 and the shaft section 22 on the left hand side of the machine will be engaged with the shaft 14, only inasmuch as the teeth of the clutches which are engaged are reversed from the teeth of the clutches that are previously engaged, the machine will drive backward. If now on this backward drive either of the shaft sections 22 should break, power would still be transmitted to the other shaft section, and if the machine was rounding a curve and the inner wheel should slip for lack of proper tractive engagement with the road, the drive would automatically pass to the other wheel in the manner heretofore described. The shifting of the middle section 14 is, of course, secured by shifting the shank 42 which, through the deflected portions 43 of the rods 41, will shift the member 39 as previously described.

While, of course, the machine will be provided with means whereby the reversal of rotation of the shaft 11 may be secured, yet it is obvious that there has to be a like reversal of the clutch members in order to secure a rearward drive on the wheels 24ᵃ and 24ᵇ, and it is for this reason that I make the shaft section 14 shiftable so as to not only reverse its direction of rotation but shift the reversely toothed clutch members into action which are to be used for the rearward drive and which will cause the rearward rotation of the driving wheels 24ᵃ and 24ᵇ to permit these driving wheels to overrun the speed of reverse rotation of the shaft section 14.

As before remarked, it is possible by my construction to drive the vehicle even though one of the gears 15 or 16 be broken. Thus, for instance, if the gear 16 be broken, that is the gear whereby a forward drive is transmitted to the wheels 24ᵃ and 24ᵇ, then the transmission gearing of the vehicle is placed in "reverse" and then the shaft section 14 is shifted so as to carry the gear 15 into engagement with the driving gear wheel 12 and, of course, the wheels 24ᵃ and 24ᵇ will be driven forward under the power of the engine just as if the gear wheel 16 had not been broken. The same is true, of course, where the machine is being backed and the driven gear wheel in mesh with the driving gear wheel 12 is broken. The member 14 is shifted so as to carry the unbroken gear wheel into engagement with the gear wheel 16 and the transmission is reversed.

It is also obvious that by properly operating the shifting members 41, the shaft section 14 may be shifted to a neutral position where both of the gears 15 and 16 are out of engagement with the beveled gear wheels 12. Furthermore, in descending a grade, the power being cut off but the driving clutch of the machine being left in, the section 14 may be shifted to its "backing" position, in which case the power shaft is partially connected to the wheels and the motor runs as a compressor, thereby acting as a brake. Also, should the motor become stalled in descending a grade the wheels will remain connected to the power shaft and the motor will again act as a brake, and there is no possibility of the rear end of the vehicle sluing.

I do not wish to be limited to the exact construction illustrated, as it is obvious that many changes might be made therein, particularly as regards providing bearings for the tubular shafts 22, and as to the details of construction of the clutch members, without departing from the spirit thereof. Thus, for instance, I do not wish to be limited to the use of the tubular or floating wheel shafts 22, as it is obvious that the tubular members 22 might be connected to the central section 14 but disconnected from the wheels and the rods 20 to operate as shafts transmitting power to the wheels. There will in this case be three driven shaft sections, however, as previously described.

I claim—

1. A driving mechanism for motor vehicles including a driving shaft, a driven shaft comprising a middle section and two wheel-carrying end sections, means for driving the middle section in either direction, spring actuated ratchet toothed clutches engaging both end sections to the middle section when the driven shaft is rotated in one direction but permitting either one of said end sections to rotate at a faster speed than the middle section, and a second set of spring actuated ratchet toothed clutches having their teeth extending in a reverse direction to the teeth of the first named set and engaging both end sections to the middle section upon a relative reverse motion of the driven shaft but permitting either one of said end sections to rotate at a faster speed than the middle section upon such reverse motion, and manually controlled means for shifting one or the other set of clutches into operative position and simultaneously shifting the other set of clutches to an inoperative position.

2. A driving mechanism for motor vehicles including a driven shaft comprising a middle section and two tubular end sections, the middle section carrying rods extending into the tubular end sections, ratchet toothed clutch members carried by both end sections, and spring actuated, ratchet toothed clutch members mounted upon said extensions or rods of the middle section and engaging both end sections to the middle section upon a straight forward drive but permitting either one of said end sections to rotate at a faster speed than the middle section.

3. A driving mechanism for motor vehicles including a driving shaft, a driven shaft comprising a middle section and two wheel-carrying end sections, the middle section being longitudinally shiftable with relation to the end sections, a driving gear wheel on the driving shaft, two driven gear wheels carried on and shiftable with the driven shaft and disposed on each side of the driven gear wheel and alternately engageable therewith as the driven shaft is longitudinally shifted, spring actuated, ratchet toothed clutches engaging both end sections to the middle section when the driving gear wheel is engaged with one of the driven gear wheels for a straight forward drive but permitting either one of said end sections to rotate at a faster speed than the middle section, and a second set of spring actuated, ratchet toothed clutches having their teeth extending in a reverse direction to the teeth of the first named set, engaging both end sections to the middle section upon a straight backward drive but permitting either one of said end sections to rotate at a faster speed than the middle section upon a backward drive.

4. A driving mechanism for motor vehicles including a driving shaft having a driving beveled gear wheel thereon, a transversely extending driven shaft comprising a middle shaft section and two wheel-carrying end sections, the middle shaft section carrying two driven beveled gear wheels on opposite sides of the driving beveled gear wheel, the middle shaft section being manually shiftable to carry one or the other of its gear wheels into engagement with the driving gear wheel, a pair of longitudinally spaced, spring actuated, ratchet toothed clutch members carried by each end shaft section, the teeth of one clutch member of each pair extending in an opposite direction to the teeth of the other clutch member of the pair, and a pair of ratchet toothed, spring actuated clutch members carried by the middle shaft section on each end thereof and disposed between respective pairs of first named clutch members but spaced from each other a distance less than the distance between the coacting pair of first named clutch members, whereby as the middle shaft section is shifted, one clutch member of each second named pair is withdrawn from clutching engagement and the other carried into clutching engagement whereby to cause one pair of clutch members on the middle shaft section to engage corresponding clutch members on the end shaft sections for a straight forward drive or to cause the other pair of clutch members on the middle shaft section to engage the other clutch members on the end shaft sections to secure driving engagement between the middle and end sections upon a straight rearward drive, all of said clutch members being so formed as to permit either one of said end sections to rotate at a faster speed than the middle section.

5. A driving mechanism for motor vehicles including a driving shaft, a driven shaft comprising a middle section and two wheel-carrying end sections, the middle section being shiftable with relation to the end sections, a driving beveled gear wheel on the driving shaft, two driven beveled gear wheels carried on and shiftable with the driven shaft and disposed on each side of the driving gear wheel and alternately engageable therewith, spring actuated, ratchet clutches engaging both end sections to the middle section when the driving gear wheel is engaged with one of the driven gear wheels for a straight forward drive but permitting either one of said end sections to rotate at a faster speed than the middle section, and a second set of spring actuated clutch members having teeth extending in a reverse direction to the teeth of the first named set of clutch members and engaging both of the end sections to the middle section upon a straight backward drive but permitting either one of said end sections to rotate at a faster speed than the middle section, and means for securing a longitudinal movement of the middle shaft section comprising a collar rotatably mounted upon the middle shaft section but having longitudinal movement therewith, the collar having lateral flanges, and means movable in one direction to wedge the collar laterally in one direction or upon a movement of said means in the other direction to wedge the collar in the opposite direction.

6. A driving mechanism for motor vehicles including a driving shaft, a driven shaft comprising a middle section and two wheel-carrying end sections, the middle section being shiftable with relation to the end sections, a driving beveled gear wheel on the driving shaft, two driven beveled gear wheels carried on and shiftable with the driven shaft and disposed on each side of the driving gear wheel and alternately engageable therewith, spring actuated, ratchet clutches engaging both end sections to the middle section when the driving gear wheel is engaged with one of the driven gear wheels for a straight forward drive but permitting either one of said end sections to rotate at a faster speed than the middle section, a second set of spring actuated clutch members having teeth extending in a reverse direction to the teeth of the first named set of clutch members and engaging both of the end sections to the middle section upon a straight backward drive but permitting either one of said end sections to rotate at a faster speed than the middle section, means for securing a longitudinal movement of the middle shaft section comprising a collar rotatably mounted upon the middle shaft section but having longitudinal movement therewith, the collar having lateral flanges, and means for wedging the collar in either direction comprising rods engaging between the flanges of the collar, each of said rods having two straight portions connected by an angularly deflected portion, the angularly deflected portions of the rods engaging said collar to shift it laterally in one direction or the other depending on the direction of movement of the rod, the straight portions of the rod holding said collar in its shifted position.

7. In a mechanism of the character described, an annular clutch member having ratchet teeth on its end face, an annulus confronting said clutch member and having longitudinally extending grooves, and a second clutch member shiftable toward or from the annulus and having longitudinally extending clutch teeth disposed in the grooves of the annulus and projecting beyond said grooves and adapted to engage the clutch teeth of the first named clutch member, and a spring urging the last named clutch member toward the first named clutch member to project the teeth through the annulus.

8. A driving mechanism for motor vehicles including a driving shaft having a driving beveled gear wheel, a transversely extending driven shaft comprising a middle shaft section and two tubular wheel-carrying end sections in which the middle shaft section has sliding engagement, the middle shaft section carrying two driven beveled gear wheels on opposite sides of the driving gear wheel and the middle shaft section being manually shiftable to carry one or the other of the gear wheels into engagement with the driving gear wheel, a housing within which all of said shaft sections are rotatably mounted, a pair of longitudinally spaced, spring actuated, ratchet toothed clutch members carried within each tubular end shaft section, the teeth of one clutch member of each pair extending in an opposite direction to the teeth of the other clutch member of the pair, said middle shaft section having rods extending from its ends into the tubular end shaft sections and through said clutch members, and a pair of ratchet toothed, spring actuated clutch members mounted on each rod and disposed between the respective pairs of first named clutch members but spaced from each other a distance less than the distance between the coacting pairs of first named clutch members, the ratchet teeth of the clutch members on each rod being reversed with relation to each other whereby, as the middle shaft section is shifted, one clutch member of the second named pair is withdrawn from clutching engagement with the corresponding clutch member of the first named pair and the other clutch members of the second named pair carried into clutching engagement with the other clutch member of the first named pair.

9. A driving mechanism for motor vehicles including a driving shaft having a driving beveled gear wheel, a transversely extending driven shaft comprising a middle shaft section and two tubular wheel-carrying end sections in which the middle shaft section has sliding engagement, the middle shaft section carrying two driven beveled gear wheels on opposite sides of the driving gear wheel and the middle shaft section being manually shiftable to carry one or the other of the gear wheels into engagement with the driving gear wheel, a housing within which all of said shaft sections are rotatably mounted, a pair of longitudinally spaced, spring actuated, ratchet toothed clutch members carried within each tubular end shaft section, the teeth of one clutch member of each pair extending in an opposite direction to the teeth of the other clutch member of the pair, said middle shaft section having rods extending from its ends into the tubular end shaft sections and through said clutch members, a pair of ratchet toothed clutch members slidingly mounted on each of said rods but rotating therewith and disposed between the respective pairs of first named clutch members but spaced from each other a distance less than the distance between the coacting pairs of first named clutch members and having their teeth extending in reverse directions with relation to each other, and a spring disposed between the clutch members on each rod and urging the clutch members outward.

10. A driving mechanism for motor vehicles including a driving shaft having a driving beveled gear wheel, a transversely extending driven shaft comprising a middle shaft section and two tubular wheel-carrying end sections in which the middle shaft section has sliding engagement, the middle shaft section carrying two driven beveled gear wheels on opposite sides of the driving gear wheel and the middle shaft section being manually shiftable to carry one or the other of the gear wheels into engagement with the driving gear wheel, a housing within which all of said shaft sections are rotatably mounted, a pair of longitudinally spaced, spring actuated, ratchet toothed clutch members carried within each tubular end shaft section, the teeth of one clutch member of each pair extending in an opposite direction to the teeth of the other clutch member of the pair, said middle shaft section having rods extending from its ends into the tubular end shaft sections and through said clutch members, a pair of ratchet toothed clutch members slidingly mounted on each of said rods but rotating therewith and disposed between the respective pairs of first named clutch members but spaced from each other a distance less than the distance between the coacting pairs of first named clutch members and having their teeth extending in reverse directions with relation to each other, a spring disposed between the clutch members on each rod and urging the clutch members outward, and a sleeve surrounding each rod and around which said spring extends, said sleeve preventing the undue movement of the clutch members on the rod toward each other.

In testimony whereof I hereunto affix my signature.

JAMES L. MAPES.